United States Patent
Yanusko et al.

[11] Patent Number: 5,381,706
[45] Date of Patent: Jan. 17, 1995

[54] CONNECTOR FOR REMOTE VALVE ACTUATING ASSEMBLIES

[75] Inventors: David P. Yanusko, Pottstown, Pa.; Frank J. Rocchino, Jr., Camarillo, Calif.

[73] Assignee: Teleflex Incorporated, Limerick, Pa.

[21] Appl. No.: 125,484

[22] Filed: Sep. 22, 1993

[51] Int. Cl.6 .................................... F16G 11/09
[52] U.S. Cl. ........................ 74/505; 74/89.2; 74/500.5; 474/253; 403/58
[58] Field of Search ............ 74/89.2, 89.21, 500.5, 74/502.6, 504, 505, 506; 474/204, 253, 255, 257; 403/57, 58

[56] References Cited

U.S. PATENT DOCUMENTS

| | | | |
|---|---|---|---|
| 2,335,455 | 11/1943 | Scott | 74/216.5 |
| 2,615,074 | 10/1952 | Bronovicki | 174/10 |
| 2,957,353 | 10/1960 | Babacz | 74/501 |
| 3,218,880 | 11/1965 | Bentley | 74/502 |
| 3,237,977 | 3/1966 | Batchelder | 287/119 |
| 3,429,197 | 2/1969 | Loewenstern | 74/502 |
| 3,468,569 | 9/1969 | Ballard et al. | 287/82 |
| 3,825,356 | 7/1974 | Crook, Jr. | 403/122 |
| 4,290,762 | 9/1981 | Lapeyre | 403/58 X |
| 4,509,387 | 4/1985 | Tschanz et al. | 74/505 |
| 5,074,162 | 12/1991 | Yanusko | 74/89.2 X |
| 5,159,849 | 11/1992 | Womack | 74/502.3 |
| 5,197,348 | 3/1993 | Womack | 74/502.3 |

Primary Examiner—Richard M. Lorence
Attorney, Agent, or Firm—Reising, Ethington, Barnard, Perry & Milton

[57] ABSTRACT

A remote control assembly (10) of the type for translating rotational motion from a drive wheel (12) enclosed in a drive wheel housing (27) to a driven wheel (16) enclosed in a driven wheel housing (28) by means of a core element (18) entrained around both wheels (12,16) in a closed all-tension system is disclosed. The assembly (10) includes first and second rigid end members (24,26) attached to respective end portions (20,22) of the core element (18). The assembly is characterized by a connector (38) for interconnecting the rigid end members (24,26) and defining a first plurality of parallel pivot axes (42) and a second plurality of parallel pivot axes (45) perpendicular to said first plurality of parallel pivot axes (42) about which said end members (24,26) pivot.

16 Claims, 5 Drawing Sheets

CONNECTOR FOR REMOTE VALVE ACTUATING ASSEMBLIES

TECHNICAL FIELD

The subject invention relates to motion transmitting remote control cable assemblies of the type for transmitting motion in a curved path, and more particularly to a system for translating rotational motion from one wheel to a second wheel by means of an core element entrained around both wheels in a closed all-tension system.

BACKGROUND ART

Remote control actuators enable an operator to control a valve from a remote control station. A remote control assembly of the type disclosed in the U.S. Pat. No. 4,509,387 to Tschanz et al., of common assignee herewith, is frequently used in ships for such a purpose. The Tschanz remote control includes a geared drive wheel, a geared driven wheel and an endless core element entrained around the drive and driven wheels to translate motion from the drive wheel to the driven wheel in a closed all-tension system. The core element includes a plurality of spaced apart radial protrusions which engage the gears on both wheels and thus enable rotational motion to be translated between the two wheels by means of the core element. The core element in this system is made endless by joining the two ends of a length of the core element with some kind of connector—usually a rigid joining tube crimped around the ends of the core element. The joining tube on the core element usually travels back and forth between the wheels.

A problem occurs with such a system whenever the core element moves relative to the wheels to such an extent that the joining tube contacts the gear teeth on one of the wheels. Since the joining tube is rigid, it cannot negotiate the radii established by the wheels and thus tends to damage the gears when contacting them, or jam between the gears and a housing which encloses the wheel. This locks any further movement of the core element and the wheels. If the joining tube is jammed between the geared wheel and the housing, the joining tube itself can be damaged, possibly allowing the ends of the core element to become detached.

Connectors such as disclosed in U.S. Pat. No. 2,957,353 to Babacz, of common assignee herewith, have a single fixed pivot axis about which the core element ends can pivot. When the core element and connector becomes twisted, a connector of this type can not negotiate the radii established by the wheels and the core element and connector do not remain entrained around the wheels. Thus, with these type of connectors jamming, as described above, still occurs.

SUMMARY OF THE INVENTION

A motion transmitting remote control cable assembly for transmitting motion in a curved path comprises a drive wheel housing for enclosing a geared drive wheel having a plurality of gear teeth and a driven wheel housing spaced apart from said drive wheel housing for enclosing a geared driven wheel having a plurality of gear teeth. A flexible motion transmitting core element comprises a flexible cable having end portions and a wire helically wrapped around the flexible cable and spaced and pitched about the entire length of the cable. The core element is entrained around the drive and the driven wheels so that the core element translates rotational motion from the drive wheel to the driven wheel in a closed all tension system. First and second rigid end members are attached to the respective end portions of the core element. The assembly is characterized by connector means for interconnecting the rigid end members and defining a first plurality of parallel pivot axes and a second plurality of parallel pivot axes perpendicular to the first plurality of parallel pivot axes about which the end members pivot so that the connector means, the end members, and the core element remain entrained around the drive and driven wheels regardless of the orientation of the core element to allow the connector means, the end members, and said core element to pass through the drive and driven housings.

DETAILED DESCRIPTION OF THE PREFERRED EMBODIMENT

Figure 1:
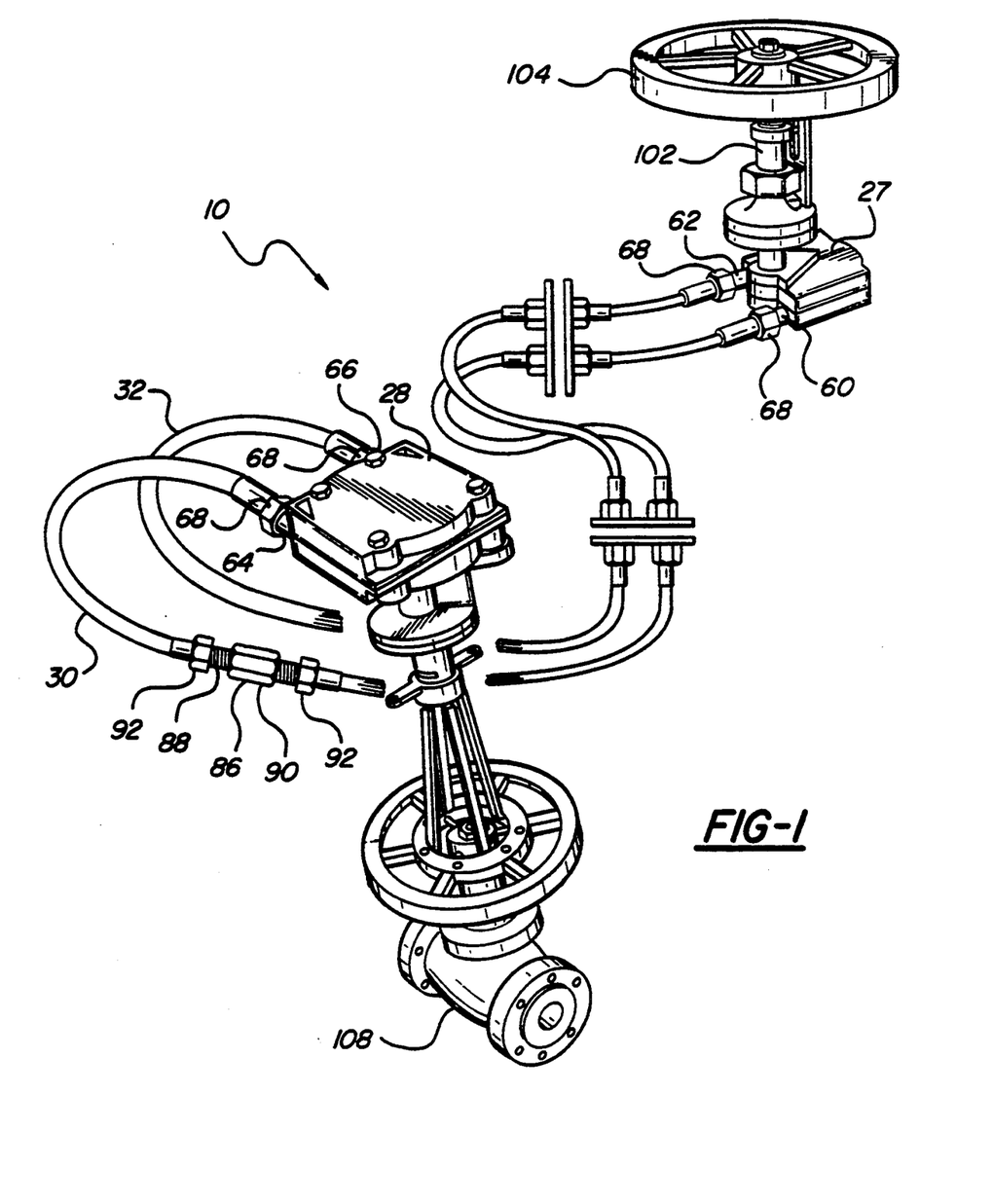
FIG. 1 is a perspective view of the remote control cable assembly, of which the subject invention is a part.
Figure 2:
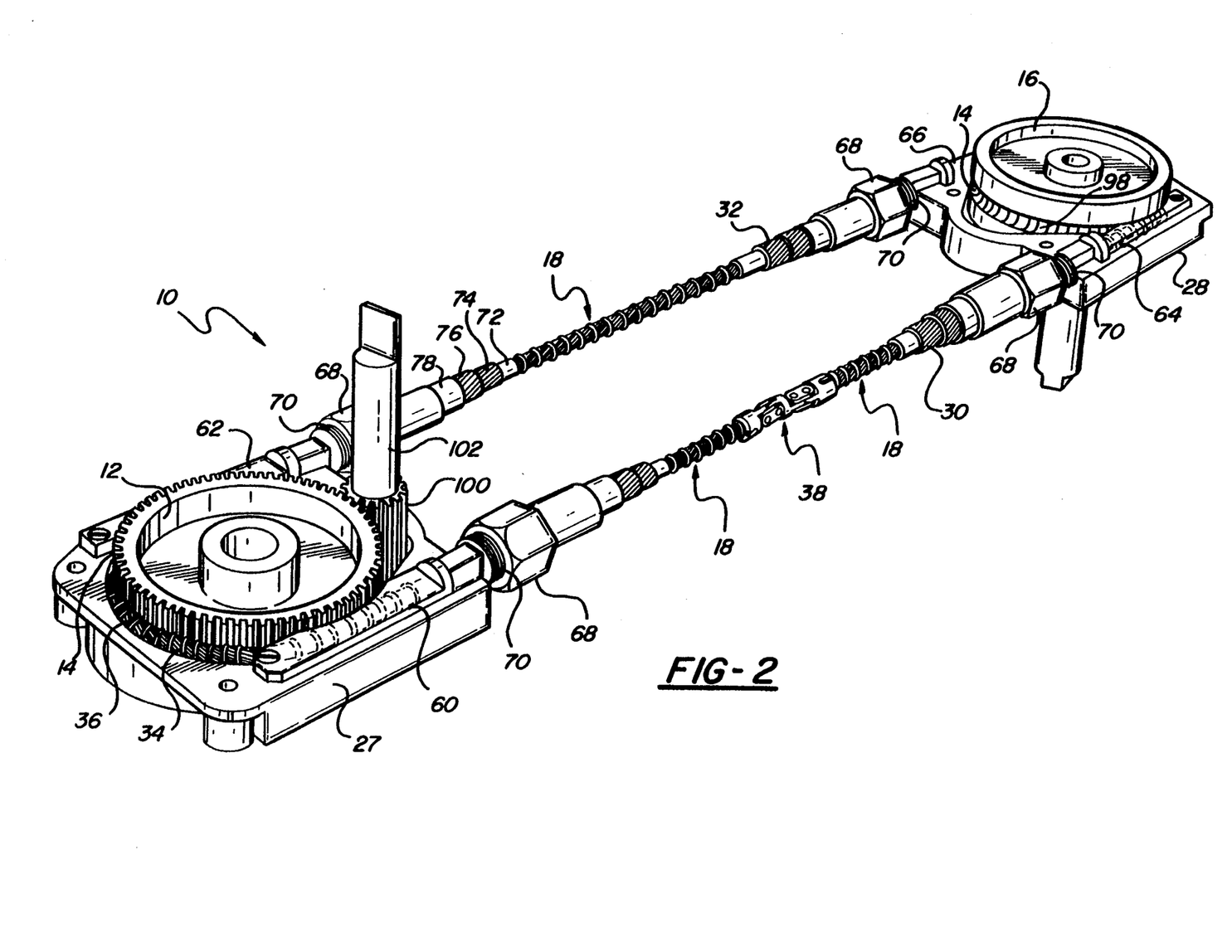
FIG. 2 is a perspective view of the subject invention with the conduits cut away and with portions of the wheel housings removed to show the core element.

The motion transmitting remote control cable assembly generally shown at 10 includes in its most basic form the following elements: a geared drive wheel 12 including a plurality of gear teeth 14 extending radially therefrom; a geared driven wheel 16 including a plurality of gear teeth 14 extending radially therefrom, the driven wheel 16 being spaced apart from the drive wheel 12; a flexible motion transmitting core element 18 having end portions 20,22; and first and second rigid end members 24,26 attached to the respective end portions 20,22 of the core element 18. The core element 18 is entrained around the drive and driven wheels 12,16 so that the core element translates rotational motion from the drive wheel 12 to the driven wheel 16 in a closed all tension system.

The remote control cable assembly 10 of the subject invention also includes a drive wheel housing 27 for housing the drive wheel 12, a driven wheel housing 28 for housing the driven wheel 16 and first and second spaced apart parallel conduits 30,32 extending between the drive wheel housing 27 and the driven wheel housing 28 for slideably supporting the core element 18.

The core element 18 comprises a plurality of long metal lay wires wrapped in helical fashion to form a flexible cable 34. This is the standard helix wrap wire widely available and known to the art. A first length of wire 36 is wrapped helically around the flexible cable 34 and spaced and pitched about the entire length of the cable 34. The helically wrapped wire 36 forms radial protrusions about the length of the cable 34 for meshing with the gear teeth 14 to entrain the core element 18 around the drive and the driven wheels 12,16 so that the core element 18 translates rotational motion from the drive wheel 12 to the driven wheel 16 as described above.

Figure 3:
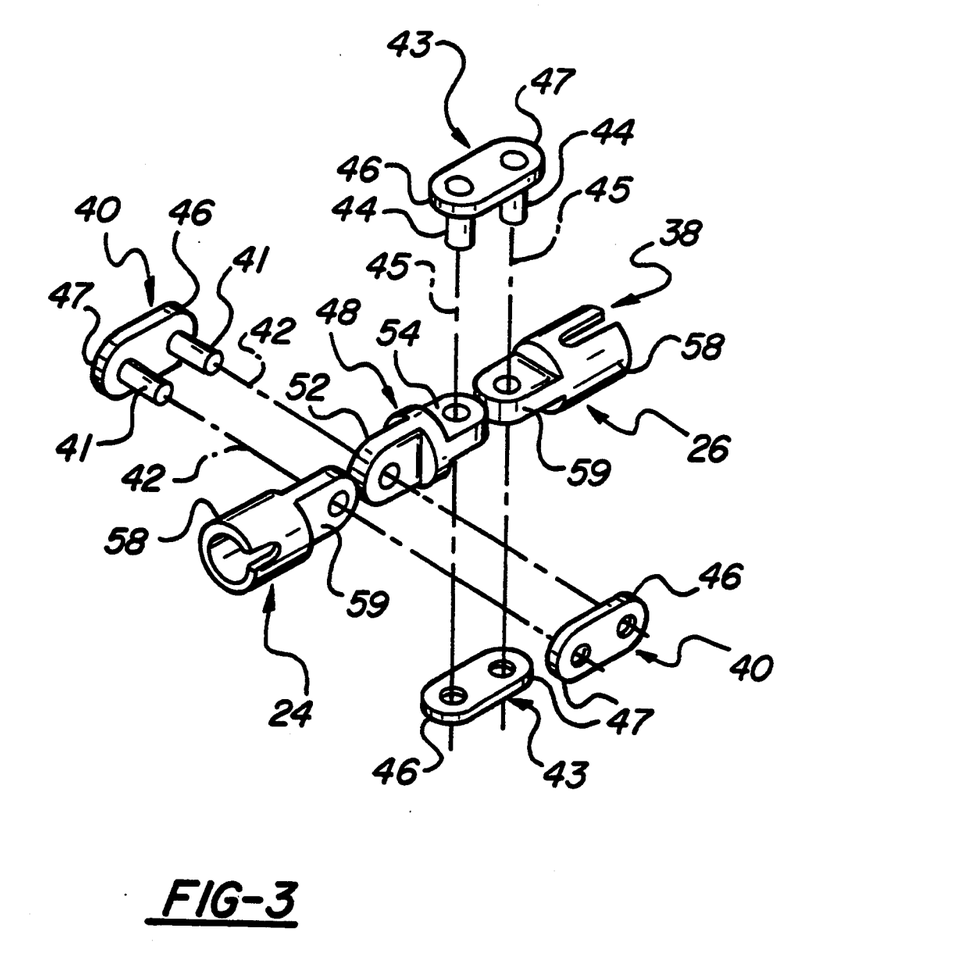
FIG. 3 is an exploded view of the end members and connector of the present invention.

The assembly 10 is characterized by a connector 38 for interconnecting the rigid end members 24,26 attached to end portions 20,22 of the core element 18. The connector 38 comprises a first chain link 40 having a first end 46 and a second end 47 and a first pair of pivot pins 41 extending through the first and second ends 46,47 of the first chain link 40 to define a first plurality of parallel pivot axes 42. The connector 38 further comprises a second chain link 43 also having a first end 46 and a second end 47 and a second pair of pivot pins 44 extending through the first and second ends 46,47 of the second chain link 43 to define a second plurality of parallel pivot axes 45. A center link 48 pivotally connects the first ends 46 of the first and second chain links 40,43 so that the first pair of pivot pins 41 and the first plurality of parallel pivot axes 42 are perpendicular to the second pair of pivot pins 44 and the second plurality of parallel pivot axes 45. The end members 24,26 and the respective end portions 20,22 attached to the end members 24,26 pivot about first and second pivot axes 42,45 and first and second pair of pins 41,44 so that the connector 38 and the end members 24,26 and the core element remain entrained around the drive and driven wheels 12,16 regardless of the orientation of the core element 18 to allow the connector 38 and the end members 24,26 and the core element 18 to pass through the drive and driven housings 26,28. Thus, even when the core element 18 is twisted during operation, either the first chain link 40 and corresponding first pair of pivot pins 41 or the second chain link 43 and corresponding second pair of pivot pins 44 allow the core element end portions 20,22 to be pivoted about at least two parallel pivot axes thereby enabling the connector 38 and end members 24,26 and core element 18 to negotiate the radii established by the drive and driven wheels 12,16 and freely past through the drive and driven housings 26,28.

First and second chain links 40,43 are of the type used in bicycle chains or as described in U.S. Pat. No. 2,737,822 issued to Morse. As shown in the figures, the connector 38 comprises at least one pair of links 40 and one pair of links 43 spaced apart in a parallel fashion by the first and second pair of pivot pins 41,44. First and second pair of pivot pins 41,44 are perpendicular to the chain links 40,43. The center link 48 includes a first connecting arm 52 and a second connecting arm 54 perpendicular to the first connecting arm 52. The arms 52,54 are pivotally connected to the first ends 46 of chain links 40,43. Although shown as only having one pair of links 40 and one pair of links 43 and corresponding pairs of pivot pins 41,44, it will be appreciated that the connector 38 may comprise more than one pairs of links 40 and/or more than one pair of links 43 and corresponding pairs of pivot pins 41,44 linked together in end-to-end fashion to form two distinct lengths of roller chains of the type described in U.S. Pat. No. 2,737,822 issued to Morse.

First and second end members 24,26 include a socket portion 58 connected to the respective end portions 20,22 of core element 18 by conventional means such as crimping and/or soldering. First and second end members 24,26 also include a neck portion 59 protruding from the socket portion 58. Neck portions 59 pivotally connect the first and second end members 24,26 to the second ends 47 of the first and second chain links 40,43. Thus, the pivot pins 41,44 of first and second chain links 40,43 define a plurality of axes 42,45 around which the end portions 20,22 of the core element 18 can pivot.

The drive wheel housing 27 defines a space for encasing the drive wheel 12. The housing 27 generally includes two or more pieces (e.g. at least a top and bottom half), usually metal, which fit together to define a closed space around the wheel 12. The drive wheel housing 27 includes a first core element guide tube 60 extending through the drive wheel housing 27 tangentially from the drive wheel 12 and a second core element guide tube 62 extending tangentially through the drive housing 27 from the drive wheel 12 parallel to and in the same direction as the first core element guide tube 60. These guide tubes 60,62 actually act as conduits for the core element 18, end members 24,26 and connector 38, enabling the core element 18, end members 24,26 and connector 38 to pass into the housing 27, around the drive wheel 12 and back out of the housing 27.

The driven wheel housing 28 defines a space for encasing the driven wheel 16. The driven wheel housing 28 also comprises at least two pieces which fit together to define a closed space around the wheel 16. The driven wheel housing 28 includes a third core element guide tube 64 extending through the driven wheel housing 28 tangentially from the driven wheel 16 and a fourth core element guide tube 66 extending through the driven wheel housing 28 tangentially from the driven wheel 16 parallel to and in the same direction as the third core element guide tube 66.

The first conduit 30 extends between the first core element guide tube 60 and the third core element guide tube 64. The second conduit 32 extends between the second core element guide tube 62 and the fourth core element guide tube 66 so that the core element 18, end members 24,26 and connector 38 passes through the first conduit 30 into the first core element guide tube 60, around the drive wheel 12, through the second core element guide tube 62, through the second conduit 32, into the fourth core element guide tube 66, around the driven wheel 16, through the third core element guide tube 64 and back into the first conduit 30. The conduits 30,32 include radially extending flanges (not shown) disposed on both ends which retain nuts 68 for threading the ends of the conduits 30,32 into engagement with something such as the respective housings 27,28. This is shown in FIG. 2. All of the guide tubes 60,62,64,66 on the housings 27,28 include threads 70 on their outer surfaces to enable these nuts 68 to thread thereover and fix the conduits 30,32 into engagement with the guide tubes as shown in the figures.

Each conduit 30,32 includes four layers of material forming generally concentric tubes wherein the innermost layer 72 comprises a polytetraflouroethylene liner; the second innermost layer 74 comprises high tensile strength steel wires wrapped around the liner; the third innermost layer 76 comprises a cross wrap of steel wires; and where the outermost layer 78 is a polytetraflouroethylene jacket. In other words, these layers are four concentric jackets having a tubular shape. This is a conduit which already finds common use in Teleflex remote mechanical valve actuator systems.

Figure 5:
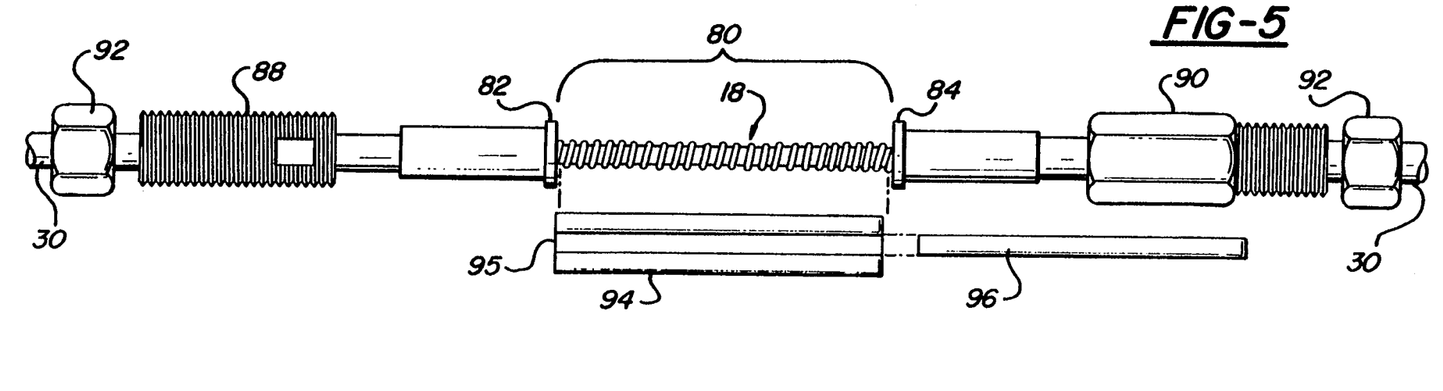
FIG. 5 is a side view of the first conduit showing the opening with the cover and with the bushing and the brass rod removed.

The first conduit 30 includes a radial break to define an opening 80, allowing access to a length of the core element 18. Another way to view this is to see the first conduit 30 as comprising two spaced apart conduits which define an opening 80 therebetween. The first conduit 30 includes a first radially extending annular flange 82 disposed on one side of the opening 80 and a second radially extending flange 84 disposed on the other side of the opening 80. In other words, the first and second flanges 82,84 disposed on either side of the radial break in the conduit 30 are spaced apart from each other to define the opening 80.

The first conduit 30 includes a cover 86 for covering the opening 80. The cover 86 includes a telescoping tube 88 having a first end and a second end, the telescoping tube 88 being disposed around the first conduit 30 partially over the opening 80 and including helical threads disposed therearound. The cover 86 also includes a coupling tube 90 disposed around the first conduit 30 and partly over the opening 80, the coupling tube 90 including helical threads disposed within the coupling tube 90 and threadingly engaging the threads on the telescoping tube 88. The coupling tube 90 further includes threads disposed on a portion of its outer surface opposite from the end which engages the telescoping tube 88. The cover 86 also includes a first conduit nut 92 threadingly engaging the first end of the telescoping tube 88 and abutting against the first flange 82 when the telescoping tube 88 engages the coupling tube 90. The cover 86 also includes a second conduit nut 92 threadingly engaging the second end of the coupling tube 90 and abutting against the second flange 84.

Figure 4A:
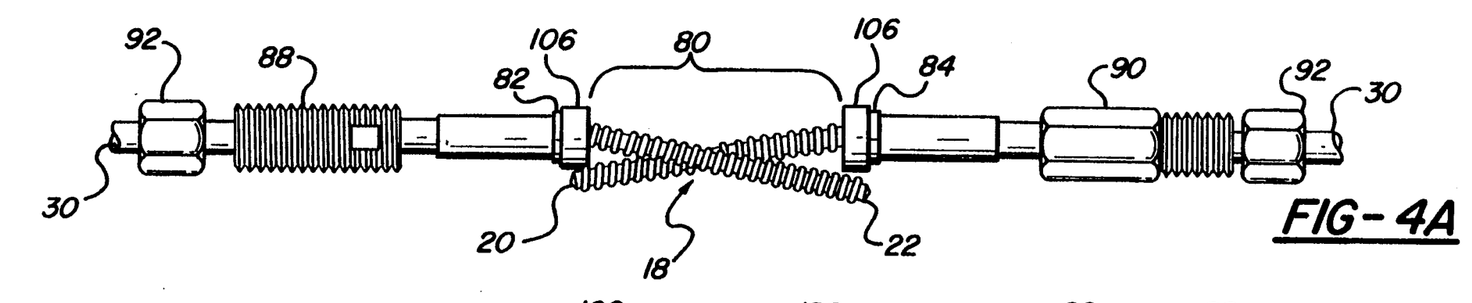
FIG. 4a is a side view of the first conduit with the opening being open, with the ends of the core element extending therefrom and with tensioning nuts disposed over the ends of the core element.
Figure 4B:
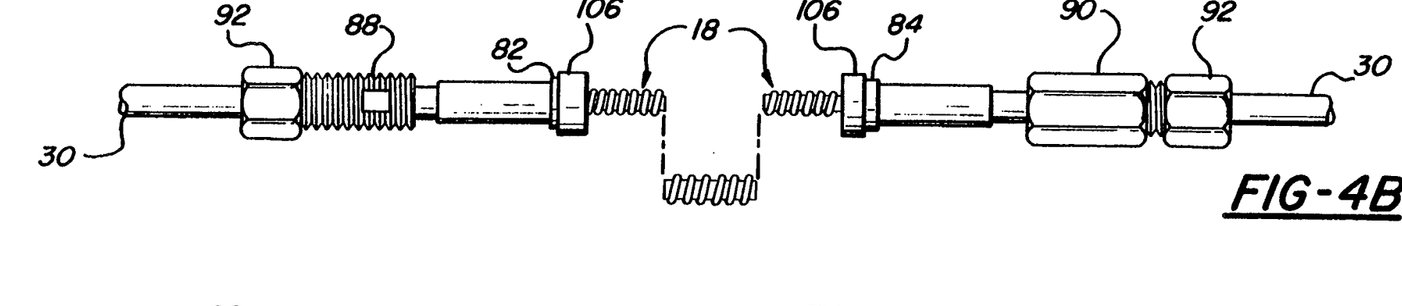
FIG. 4b is similar to FIG. 4a except that the ends of the core element have been trimmed to make room for the connector.
Figure 4C:
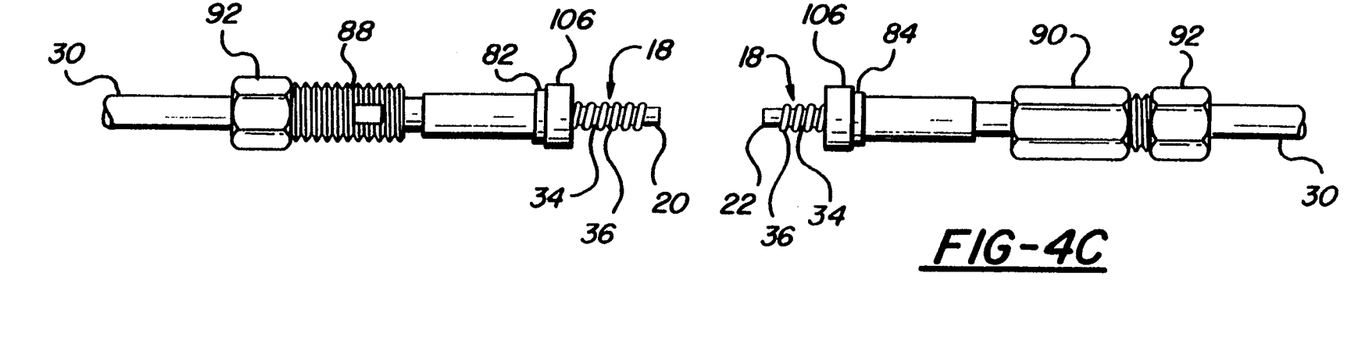
FIG. 4c is similar to FIG. 4b except that some of the helically wrapped wire has been removed to make room for the socket portions of the end members.
Figure 4D:
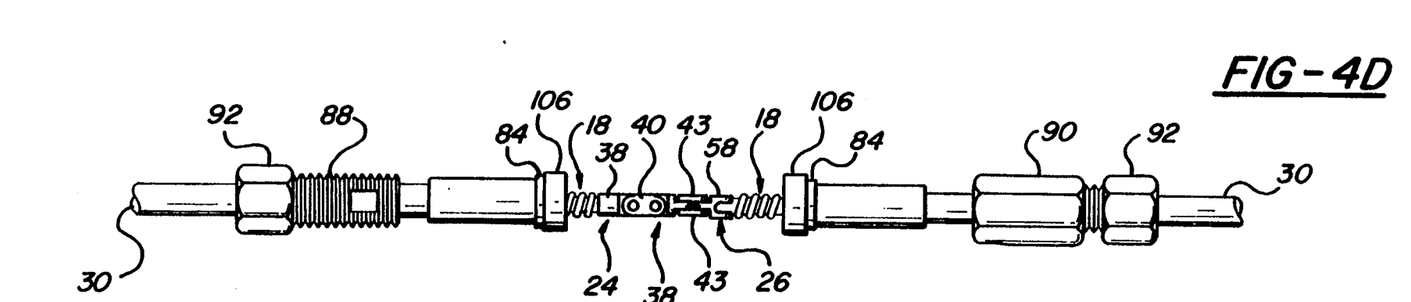
FIG. 4d is similar to FIG. 4c except that the ends of the core element have been attached to the end members which in turn have already been pivotally connected to the connector.
Figure 4E:
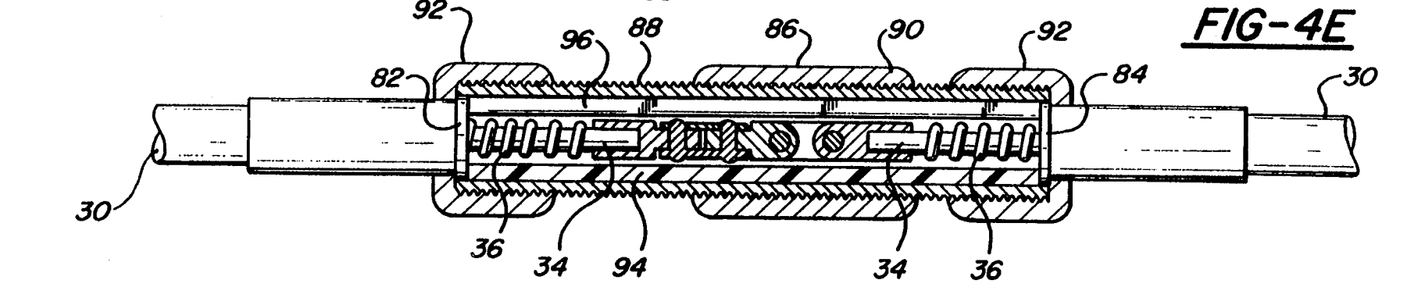
FIG. 4e is a side view of the first conduit with the cover over the opening being cut away to show the bushing and the brass rod.

The cover 86 also includes a "U" shaped bushing 94 extending over the core element 18 between the first and the second flanges 82,84 under the cover 86. The bushing 94 includes a slit 95 along its length between the first and second flanges 82,84. The bushing 94 is generally made from brass and includes the "U" shape to provide clearance for the core element 18 when the bushing is inserted thereover. The cover 86 finally includes a brass rod 96 disposed in the slit or opening 95 of the bushing 94. The brass rod 96 and the bushing 94 maintain a predetermined distance between the flanges 82,84 on the first conduit 30, and thereby maintain a minimum size of the opening 80.

The drive wheel 12 includes a plurality of gear teeth 14 spaced radially around the wheel. The teeth 14 also extend parallel to each other and parallel to the axis through the drive wheel 12.

The driven wheel 16 includes a groove 98 extending radially into and circularly about the periphery of the driven wheel 16. The groove 98 includes the plurality of spaced apart groove teeth 14 for engaging the radial protrusions created by the helically wrapped wire 36 on the core element 18.

The assembly 10 includes an actuator gear 100 within the drive wheel housing 27 engaging the gear teeth 14 on the drive wheel 12 for actuating the drive wheel. The teeth 14 on the drive wheel 12 must extend far enough to simultaneously mesh and engage the protrusions formed by the helically wrapped wire 36 on the core element 18 and the gear teeth on the actuator gear 100 as shown in the figures. The assembly 10 also includes a shaft 102 extending through the drive wheel housing 27 to the actuator gear 100 and attaching coaxially with the actuator gear, the shaft 102 including actuator means for rotating the shaft 102 and the actuator gear 100. The actuator means includes a wheel 104 disposed coaxially on the shaft 102 opposite from the actuator gear 100.

The assembly 10 heretofore described is nearly identical to the assembly disclosed in the U.S. Pat. No. 4,509,387, the teachings of which are incorporated herein by reference. The main difference between the subject invention and the existing remote mechanical valve actuator lies in the improvement of the connector 38.

FIGS. 4a–4e are included to illustrate the following method for assembling the subject invention. First, the end portion 20 of the core element 18 is fed into the opening 80 on the first conduit 30 and slid along the first conduit 30 toward the drive wheel housing 27. The core element 18 passes through the first guide tube 60 until it contacts the drive wheel 12. It is drawn around the drive wheel 12 and passes through the second guide tube 62 and into the second conduit 32. This involves rotating the drive wheel 12 to draw the core element 18 through. The core element 18 then slides along the second conduit 32 until it passes through the third guide tube 64 in the driven wheel housing 28. It is then drawn around the driven wheel 16 until it passes out of the driven wheel housing 28 via the fourth guide tube 66. This involves rotating the driven wheel 16 to draw the core element 18 around it. The core element 18 finally slides along the first conduit 30 toward the opening 80 until the end portion 20 passes back out of the opening 80.

After the core element 18 generally surrounds the wheels 12,16 so that both ends 20,22 protrude from the opening 80 in the first conduit 30, the ends 20,22 of the core element 18 are attached by the rigid end members 24,26 and connector 38. This involves several steps. First, the core element 18 is tensioned by threading tensioning nuts 106 onto both ends 20,22 of the core element 18 until the nuts 106 abut the flanges 82,84 on either side of the opening 80. Threading the nuts 106 further, i.e. after they abut the flanges 82,84, will tend to draw any slack out of the core element 18. The core element ends are then trimmed to exact length, which is defined as the length at which the cable ends are located 1 ⅜ inches (or a distance matching the approximate maximum length of the connector 38) apart after the core element 18 is tensioned to a predetermined tension. Next, a segment of the helix wire 36 is removed from each end portion 20,22 of the core element 18 to make room for the socket portion of the rigid end members 24,26 which crimps and is soldered thereover.

The helix wire 36 is removed with the following preferred method. The helix wire 36 is removed from the cable 34 of the core element 18 by making one cut along the length of the segment from which the wire is to be removed, and a second cut along the same segment spaced roughly 180 degrees around the cable 34. The cut only extends through the helix wire 36 and not into the cable 34 around which the helix wire is wrapped. The two cuts allow the helix wire 36 to be removed in a number of curved pieces. The ends of the helix wire 36 remaining on the cable 34 should then be soldered to the cable 34. This will secure the helix wire 36 to the core element 18 and prevent any unravelling. It will be noted that other methods of removing the helix wire 36 from the cable 18 are possible. But at this time, the applicant considers the above "two-cut" method to be the best.

Once the helix wire 36 is removed from the ends 20,22 of the core element 18, the end members 24,26 are pivotally connected to the chain links 40,43, respectively, using one of the pair of pivot pins 41,44. The striped end portions 20,22 of the core element 18 are placed in the socket portions 58 of the end members 24,26 and the socket portions 58 are then crimped around the end portions 20,22. The stripped end portions 20,22 are then soldered to the crimped socket portions 58.

The tensioning nuts 106 are then removed. The nuts 106 are split nuts, meaning that each consists of two halves, which enables the nuts to be broken easily for removal from around the core element 18. If the nuts 106 did not have any predisposition to break into pieces they would be much more difficult to remove. Rough surfaces caused by soldering are then removed by using a file. A grease lubricant is then applied to the connector 38, end members 24,26 and the surrounding core element 18.

Next, the bushing 94 having the axial slit 95 therealong is placed in the opening 80 of the first conduit 30 between the first and second flanges 82,84 and over the core element 18. The bushing 94 is actually "U" shaped, where the slit 95 is large enough to provide clearance for the core element 18 to fit through.

Once the bushing 94 is placed in the opening 80 over the core element 18, the brass rod 96 is inserted along the slit 95 between the first and second flanges 82,84 of the first conduit 30.

Finally, the opening 80 on the first conduit 30 is closed. This is accomplished by sliding the telescoping tube 88 and the coupling tube 90 along the conduit until they meet over the opening 80. The telescoping tube 88 then threads into the coupling tube 90 until the conduit nuts 92 abut the flanges 82,84 on either side of the opening 80.

In operation, a valve 108 is controlled remotely by turning the wheel 104 clockwise or counterclockwise. The shaft 102 rotates with the turning of the wheel 104, the actuator gear 100 rotates with the turning of the shaft 102, the actuator gear 100 rotates the drive wheel 12, and the drive wheel 12 translates motion to the core element 18. The core element translates motion to the driven wheel 16. The driven wheel 16 is coupled to the valve 108 such that the torque force of driven wheel 16 opens or closes the valve 108.

The connector 38 can be inspected or removed. This is accomplished by removing the cover 86 over the opening 80 on the first conduit 30; removing the bushing 94 and the brass rod 96; and feeding the core element 18 manually in one direction or the other until the connector 38 is visible again in the opening 80.

The invention has been described in an illustrative manner, and it is to be understood that the terminology which has been used is intended to be in the nature of words of description rather that of limitation.

Obviously, many variations and modifications are possible in light of the above teachings. It is, therefore, to be understood that within the scope of the appended claims wherein reference numerals are merely for convenience and are not to be in any way limiting, the invention may be practiced otherwise than as specifically described.

We claim:

1. A motion transmitting remote control cable assembly (10) for transmitting motion in a curved path comprising:

a drive wheel housing (27) for enclosing a geared drive wheel (12) having a plurality of gear teeth (14);

a driven wheel housing (28) spaced apart from said drive wheel housing (27) for enclosing a geared driven wheel (16) having a plurality of gear teeth (14);

a flexible motion transmitting core element (18) comprising a flexible cable (34) having end portions (20,22) and a wire (36) helically wrapped around said flexible cable (34) and spaced and pitched about the entire length of said cable (34) for meshing with said gear teeth (14) to entrain said core element (18) around said drive and said driven wheels (12,16) so that said core element (18) translates rotational motion from said drive wheel (12) to said driven wheel (16) in a closed all tension system;

first and second rigid end members (24,26) attached to said respective end portions (20,22) of said core element (18); and characterized by connector means (38) for interconnecting said rigid end members (24,26) and for defining a first plurality of parallel pivot axes (42) and a second plurality of parallel pivot axes (45) perpendicular to said first plurality of parallel pivot axes (42) about which said end members (24,26) pivot so that said connector means (38) and said end members (24,26) and said core element (18) remain entrained around said drive and driven wheels (12,16) regardless of the orientation of said core element (18) to allow said connector means (38) and said end members (24,26) and said core element (18) to pass through said drive and driven housings (27,28).

2. An assembly (10) as set forth in claim 1 further characterized by said connector means (38) comprising a first chain link (40) having a first end (46) and second end (47), a first pair of pivot pins (41) extending through said first and second ends (46,47) of said first chain link (40) to define said first plurality of parallel pivot axes (42), a second chain link (43) also having a first end (46) and a second end (47), and a second pair of pivot pins (44) extending through said first and second ends (46,47) of said second chain link (43) to define said second plurality of parallel pivot axes (45).

3. An assembly (10) as set forth in claim 2 further characterized by said connector means (38) comprising a center link means (48) for pivotally connecting said first ends (46) of said first and second chain links (40,43) and for maintaining said first pair of pivot pins (41) perpendicular to said second pair of pivot pins (44).

4. An assembly (10) as set forth in claim 2 further characterized by said first and second rigid end members (24,26) comprising a socket portion (58) attached to said respective end portions (20,22) of said core element (18) and a neck portion (59) protruding from said socket portion (58) for pivotally connecting said first and second rigid end members (24,26) to said second ends (47) of said first and second chain links (40,43).

5. An assembly as set forth in claim 1 further characterized by said drive wheel housing (27) including a first core element guide tube (60) extending through said drive wheel housing (27) tangentially from said drive wheel (12) and a second core element guide tube (62) extending tangentially through said drive wheel housing (27) from said drive wheel (12) parallel to and in the same direction as said first core element guide tube (60).

6. An assembly (10) as set forth in claim 5 further characterized by said driven wheel housing (28) including a third core element guide tube (64) extending through said driven wheel housing (28) tangentially from said driven wheel (16) and a fourth core element guide tube (66) extending through said driven wheel housing (28) tangentially from said driven wheel (16) parallel to and in the same direction as said third core element guide tube (64).

7. An assembly (10) as set forth in claim 6 further characterized by including a first conduit (30) extending between said first core element guide tube (60) and said third core element guide tube (64), and a second conduit (32) extending between said second core element guide tube (62) and said fourth core element guide tube (66) so that said core element (18) passes through said first conduit (30) into said first core element guide tube (60), into said drive wheel housing (27) and around said drive wheel (12), through said second core element guide tube (62), through said second conduit (32), into said fourth core element guide tube (66), into said driven wheel housing (28) and around said driven wheel (16), through said third core element guide tube (64) and back into said first conduit (30).

8. An assembly (10) as set forth in claim 7 further characterized by said first conduit (30) being split radially to define an opening (80) along said first conduit (30) to allow access to a length of said core element (18), said first conduit (30) including a cover (86) for covering said opening (80).

9. An assembly (10) as set forth in claim 8 further characterized by said first conduit (30) including a first radially extending annular flange (82) disposed on one side of said opening (80) and a second radially extending flange (84) disposed on the other side of said opening (80).

10. An assembly (10) as set forth in claim 9 further characterized by including a "U" shaped bushing (94) extending over said core element (18) between said first and said second flanges (82,84) under said cover (86), said bushing (94) including a slit (95) along its length between said first and second flanges (82,84).

11. An assembly (10) as set forth in claim 10 further characterized by including a brass rod (96) disposed in said slit (95) of said bushing (94) between said first and said second flanges (82,84).

12. An assembly (10) as set forth in claim 8 further characterized by said cover (86) including a telescoping tube (88) having a first end and a second end, said telescoping tube (88) being disposed around said first conduit (30) partially over said opening (80) and including helical threads disposed therearound.

13. An assembly (10) as set forth in claim 12 further characterized by said cover (86) including a coupling tube (90) disposed around said first conduit (30) and partly over said opening (80), said coupling tube (90) including a first end having helical threads disposed within said coupling tube (90) and threadingly engaging said threads on said telescoping tube (88) and a second end having threads disposed outside said coupling tube (90).

14. An assembly (10) as set forth in claim 13 further characterized by said cover (86) including a first conduit nut (92) threadingly engaging said first end of said telescoping tube (88) and abutting against said first flange (82), and a second conduit nut (92) threadingly engaging said second end of said coupling tube (90) and abutting against said second flange (84).

15. An assembly (10) as set forth in claim 1 further characterized by including an actuator gear (100) within said drive wheel housing (27) engaging said gear teeth (14) on said drive wheel (12) for actuating said drive wheel (12).

16. An assembly (10) as set forth in claim 15 further characterized by including a shaft (102) extending through said drive wheel housing (27) to said actuator gear (100) and attaching co-axially with said actuator gear, said shaft (102) including a wheel (104) disposed coaxially on said shaft (102) opposite from said actuator gear (100) for rotating said shaft (102) and said actuator gear (100).

* * * * *